(12) United States Patent
Chen

(10) Patent No.: US 6,199,974 B1
(45) Date of Patent: Mar. 13, 2001

(54) INK SUPPLY SYSTEM

(75) Inventor: Chin-Tai Chen, Kaohsiung (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/429,223

(22) Filed: Oct. 28, 1999

(51) Int. Cl.$^7$ .............................. B41J 2/175; G01D 15/16
(52) U.S. Cl. ........................................... 347/85; 346/140.1
(58) Field of Search .................... 347/85, 37; 346/140.1, 346/139 A, 139 R

(56) References Cited

FOREIGN PATENT DOCUMENTS

| | | | |
|---|---|---|---|
| 680198 | * 8/1939 | (DE) | .............................. 346/140.1 |
| 57-59770 | * 4/1982 | (JP) | ................................. B41J/3/04 |
| 58-188664 | * 11/1983 | (JP) | ........................................ 347/85 |

* cited by examiner

Primary Examiner—David F. Yockey
(74) Attorney, Agent, or Firm—Beyer Weaver & Thomas LLP

(57) ABSTRACT

An ink supply system of a printing device, particularly designed for printing wide-sized media or documents, includes a container, a delivery device and a closed-loop belt. The container has a longitudinal opening and is provided with ink chambers, and the belt is disposed onto the opening of the container. The delivery device includes an intermediate and tubes. The intermediate is connected to the belt and used to move the tubes along the opening. Each if the tubes has a sucking portion immersed in the corresponding ink and a discharge portion used to connect to the corresponding printhead. The belt is connected to and pulled by the delivery device, and the holes are used to position the sucking portions, respectively. When the delivery device is actuated, the tubes are synchronously moved with the delivery device and the belt. The tubes with capillary action can continuously absorb the inks stored in the container and output it through the printheads without pressure loss.

21 Claims, 8 Drawing Sheets

INK SUPPLY SYSTEM

BACKGROUND OF THE INVENTION

1. Field of the Invention

This invention relates to an ink supply system for a printing device. In particular, this invention relates to an ink supply system provided with a sucking portion immersed and moved along an ink container to transmit ink by capillary action, so that a printhead of the printing device can be supplied with inks to print wide-sized media.

2. Description of Prior Art

The present invention is related to the following U.S. patents. [1] C. S. Chan, "Off Board Ink Supplying apparatus And Process for Process for Operating an Ink Jet Printer", U.S. Pat. No. 4,831,389, Hewlett-Packard Company, May 16, 1989. [2] Erickson et al, "Continuous Ink Refill System For Disposable Ink jet Cartridges Having A Predetermined Ink Capacity", U.S. Pat. No. 5,369,429, LaserMaster Corporation, Nov. 29, 1994. [3] Erickson et al, "Ink Supply Line Support System for A Continuous Ink Refill System for Disposable Ink jet Cartridges", U.S. Pat. No. 5,469,201, LaserMaster Corporation, Nov. 21, 1995. [4] Erickson et al, "Continuous Ink Refill System For Disposable Ink jet Cartridges Having A Predetermined Ink Capacity", U.S. Pat. No. 5,751,321, ColorSpan Corporation, May 12, 1998. [5] Murray et al, "Ink jet Printer Incorporating High Volume Ink Reservoirs", U.S. Pat. No. 5,686,947, ENCAD Inc., Nov. 11, 1997. [6] Sabonis et al, "Ink Source For An Ink Delivery System," U.S. Pat. No. 5,710,585, CalComp Inc., Jan. 20, 1998. [7] Robertson et al, "Bulk Ink Delivery System And Method," U.S. Pat. No. 5,751,319, Colossal Graphics Inc., May 12, 1998. [8] Gragg et al, "Ink Volume Sensing And Replenishing System," U.S. Pat. No. 5,757,390, Hewlett-Packard Company, May 26, 1998. [9] Seccombe et al, "Apparatus For Providing Ink To A Printhead," U.S. Pat. No. 5,650,811, Hewlett-Packard Company, Jul. 22, 1997. [10] Chuong C.Ta., "Rigid Tube Off-Axis Ink Supply," U.S. Pat. No. 5,691,754, Hewlett-Packard Company, Nov. 25, 1997. [11] Pederson et al, "Printer", U.S. Pat. No. 5,798,781, Aug 25, 1998. [12] Ivan Rezanka , "Thermal Ink Jet Printing System With Continuous Ink Circulation Through A Printhead," Xerox Corporation, U.S. Pat. No. 5,818,485, Oct. 6, 1998.

C. S. Chan [1] disclosed an ink supplying apparatus provided with "off board" function and its structure. A tubing using capillary action is applied to increase the duration of the ink usage while printing is processed.

Inventions [2-3-4-5-6-7-8] disclosed in 1994~1998 are derivatives of the off-board ink supplying apparatus. Long and flexible tubing means are provided in these cases, suitable for printing wider sized media or documents. The tubing means is a flexible tube provided with a length larger than the maximum width of the printer or plotter; and the tube is connected to the printhead. During the printing process, the tube is swung by the moving printhead and easy to be worn off by the neighboring elements, such as the housing of the printer or plotter. Pressure losses (usually several mm W.C.) occur in the swaying tube, and there is a pressure difference between static and dynamic conditions of the printhead. Therefore, ink leakage and the entrance air easily occurs in the nozzle of the printhead and the quality of printing is decreased, especially for wide-sized printers or plotters.

Although Seccombe et al [9] disclosed an ink supply system provided with a pressure regulator so as to reduce the pressure instability in the printhead, the frictional resistance of the ink in the long tubing causes the pressure loss.

Chuong C. Ta. [10] disclosed an ink supply system provided with a rigid tube, but Chuong's system and isn't suitable for the wide-sized printer or plotter.

In the cases [11-12], dual circulation is applied to the printing system, but the aforementioned problem exists for long and flexible tubing.

SUMMARY OF THE INVENTION

To solve the above problem, the primary object of this invention is to provide an ink supply system for supplying inks to the printheads of the printer or plotter so as to print wide-sized media.

The ink supply system of the present invention comprises a container, a delivery device and a closed-loop belt provided with holes. The container has a longitudinal opening and is provided with ink chambers, and the belt is connected to the delivery device and disposed onto the opening of the container. The delivery device, used to transmit inks from the container to the printheads, comprises an intermediate and a plurality of tubes, wherein the intermediate is connected to the belt and used to move the tubes along the opening of the container. Each of the tubes has a sucking portion immersed in the corresponding ink and a discharge portion used to connect to the corresponding printhead.

When the delivery device is actuated and reciprocally moves along the bar, the tubes, limited and positioned in the holes of the belt, are synchronously moved with the delivery device and the belt. The inks stored in the container can be continuously absorbed and transmitted to the printheads through the tubes by capillary action, and the printheads can smoothly output the ink onto wider-sized media without pressure loss.

BRIEF DESCRIPTION OF THE DRAWINGS

The present invention can be more fully understood by reading the subsequent detailed description and examples with reference made to accompanying drawings in which.

DETAILED DESCRIPTION OF THE PREFERRED EMBODIMENTS

Figure 1:
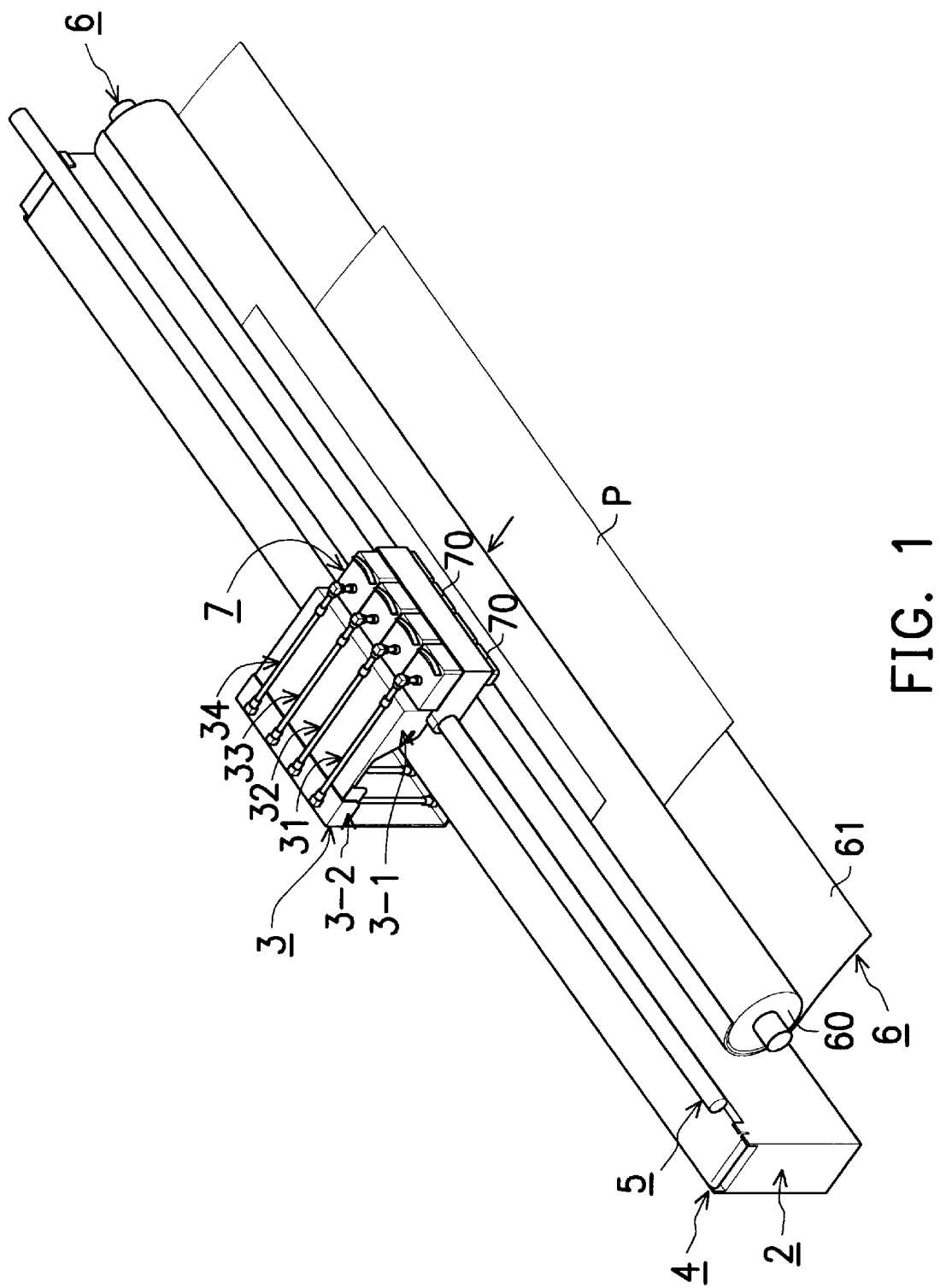
FIG. 1 is a perspective view partially showing the inner structure of a printing device, provided with the ink supply system of the present invention and a feeder (6).

FIG. 1 partially shows a perspective view of the inner structure of a printing device such as plotter or printer (not shown) which is used to print wide-sized media P. The printing device is provided with a preferred ink supply system of the present invention, a feeder 6 and output device such as printheads 7. The feeder 6 comprises a roller 60 and a curved plate 61 which are used to feed the media P passing the printing region of the printheads 7, and each of the printheads 7 is provided with a nozzle 70 used to output the inks printed on the fed media P. The roller 60 of the feeder 6 and the ink supply system of the present invention are supported by the frame structure of the plotter.

The ink supply system of the present invention comprises a longitudinal ink container 2, a delivery device 3, a flexible belt 4 and a bar 5 by the plotter. The delivery device 3 is guided by the bar 5 and used to transmit inks from the ink container 2 to the printheads 7.

Figure 2A:
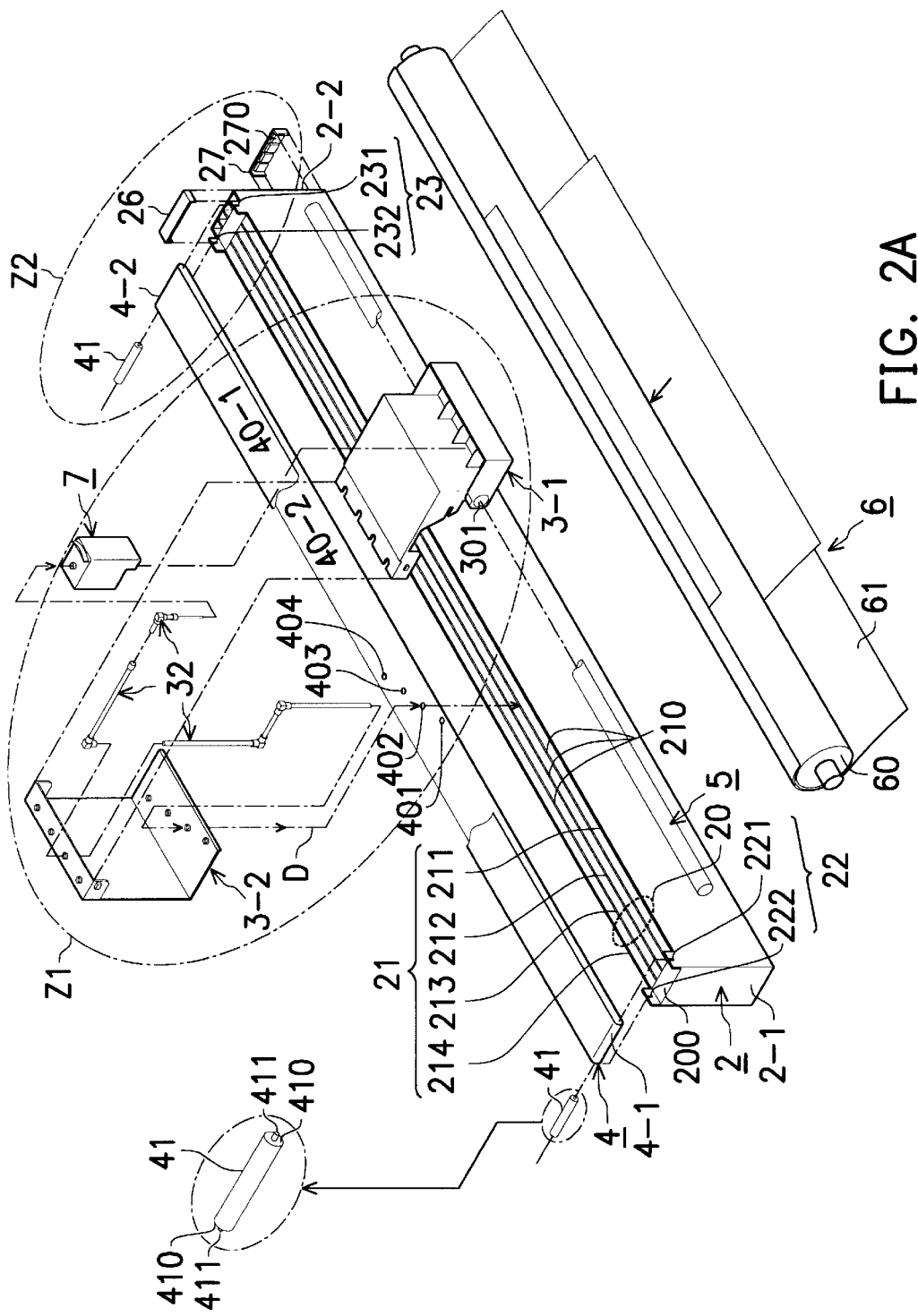
FIG. 2A is an exploded perspective view according to FIG. 1.
Figure 2B:
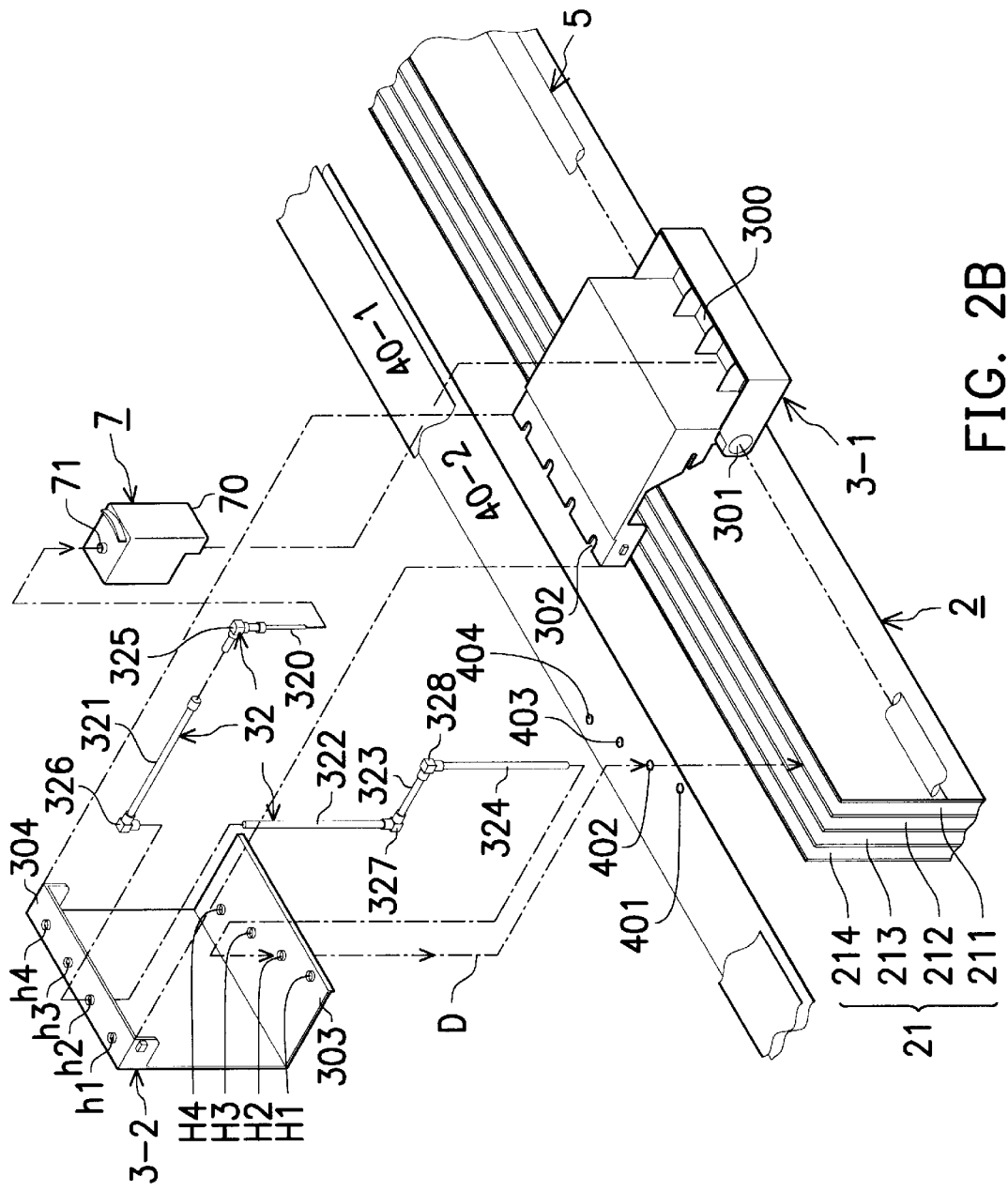
FIG. 2B is an enlarged perspective view showing the components located at the dotted-line region (Z1) according to FIG. 2A.
Figure 3:
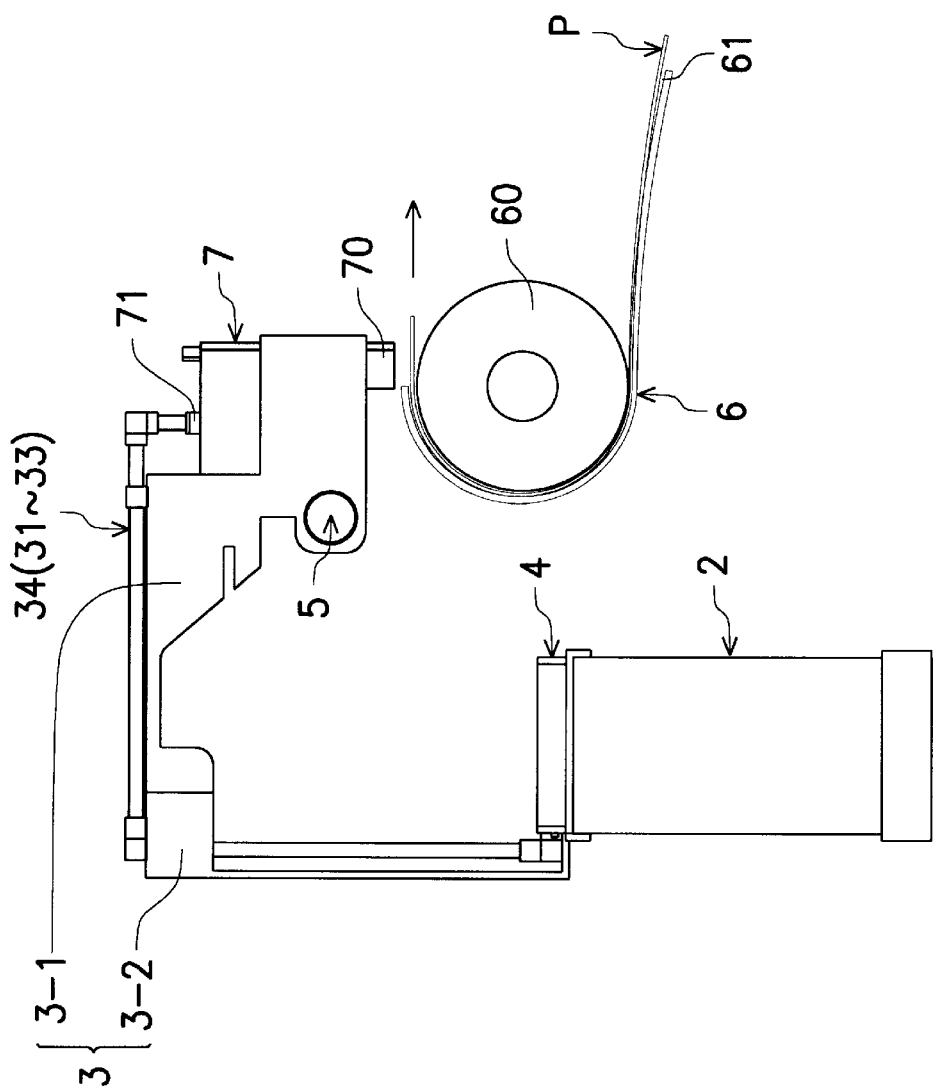
FIG. 3 is a side view according to FIG. 1.

Referring to FIG. 2A and 2B, FIG. 2A shows an exploded perspective view of FIG. 1, and FIG. 2B shows an enlarged perspective view according the dotted line Z1 of FIG. 2A. The following is the description respectively depicting the structure of the aforementioned devices and elements.

As shown in FIG. 2A, the delivery device 3 comprises a first portion 3-1, a second portion 3-2 and a set of tubes 31~34. The first portion 3-1 and the second portion 3-2 are assembled to be an intermediate to carry the printheads 7 to print the media P, and each of tubes 31~34 is positioned on the intermediate and used to connect between the container 2 and the printheads 7 to transmit inks.

The container 2 is a rectangular tank provided with a longitudinal opening 20 and an ink chamber assembly 21. The length of the container 2 is designed to be longer than the width of the media P.

Figure 4A:
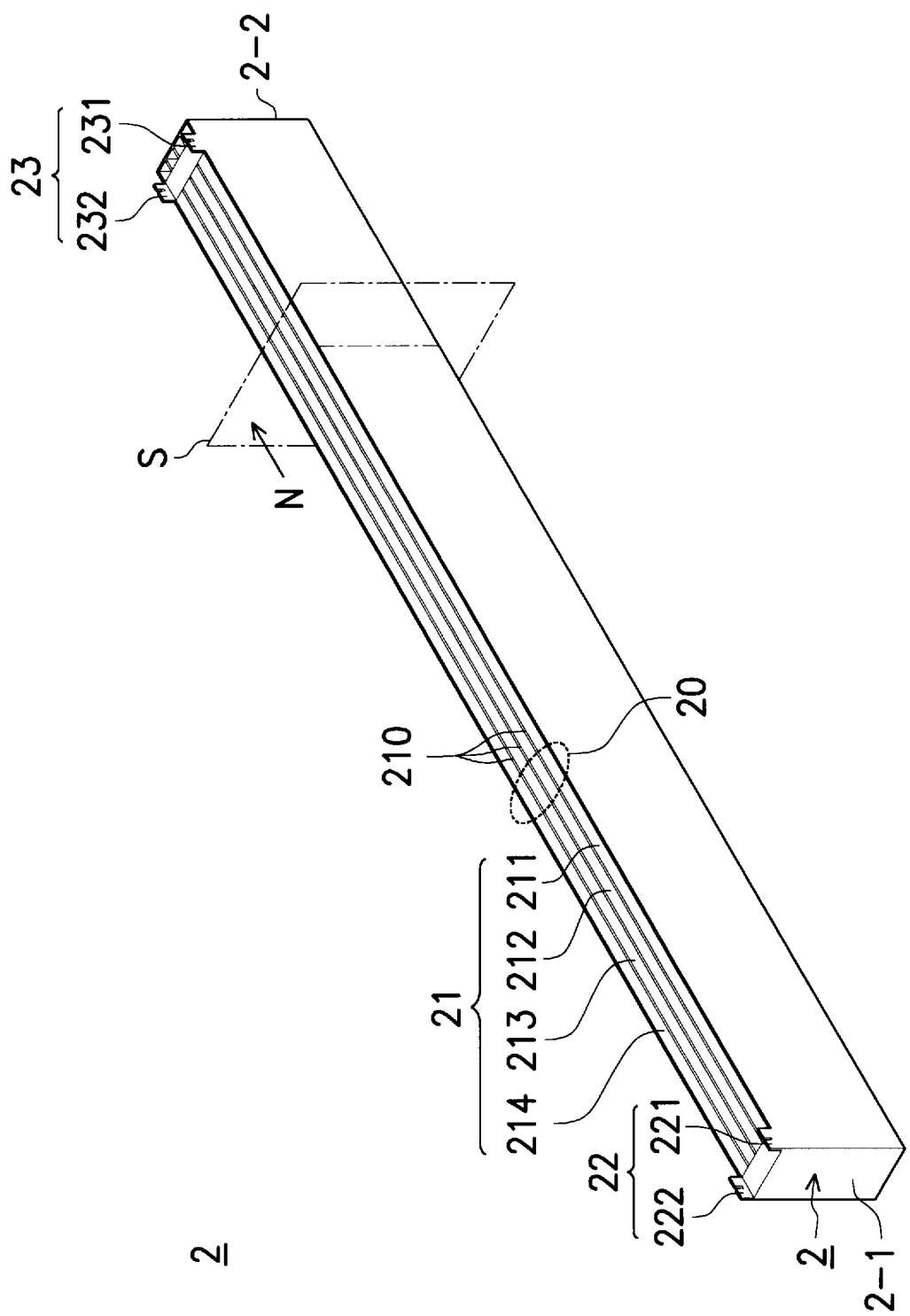
FIG. 4A is a perspective view showing the outer structure of a longitudinal container (2) according to FIG. 2.
Figure 4B:
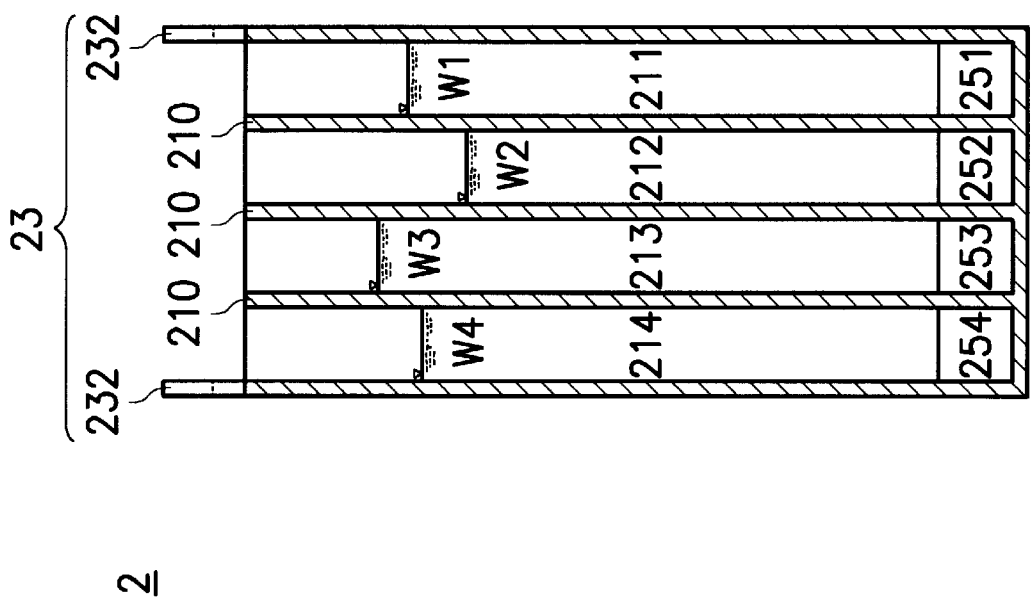
FIG. 4B is a cross-sectional view showing the inner structure of the longitudinal container (2) along the plane S with direction N according to FIG. 4A.

Referring also to FIG. 4A and 4B, FIG. 4A shows a perspective view of the container 2, and FIG. 4B shows cross-sectional view of the container 2 along the plane S with direction N according to FIG. 4A.

As shown in FIG. 4B, the ink chamber assembly 21 is composed of several longitudinal chambers 211~214 for receiving different inks W1~W4. Each of chambers 211~214 is independent to each other and any two of those chambers are spaced with a partition 210. At both end portions 2-1, 2-2 of the container 2, two supporting seats 22, 23 are symmetrically formed on the upper surface 200 of the container 2 and used to position the flexible belt 4. The supporting seat 22 is composed of two spaced upright protrusions 221, 222 and the supporting seat 23 is composed of two spaced upright protrusions 221, 222.

Referring again to FIG. 2A, the flexible belt 4 is a guiding device disposed onto the opening 20 of the container 2 so as to pull the delivery device 3 reciprocally on the bar 5. The belt 4 is a closed loop belt made of textile or leather and supported onto the container 2 by two rollers 41, 41, and the belt 4 can be divided into four parts: an upper layer 40-1, a lower layer 40-2 and two turning portions 4-1, 4-2. The rollers 41, 41 are respectively located between the upper layer 40-1 and the lower layer 40-2 and placed adjacent to the inner curved face of the turning portions 4-1, 4-2 of the belt 2. The supporting seats 22, 23 of the container 2 are used to pivotally support the roller 41, 41 and can position the belt 4 with tension disposing onto the opening 20 of the container 2.

Figure 5A:
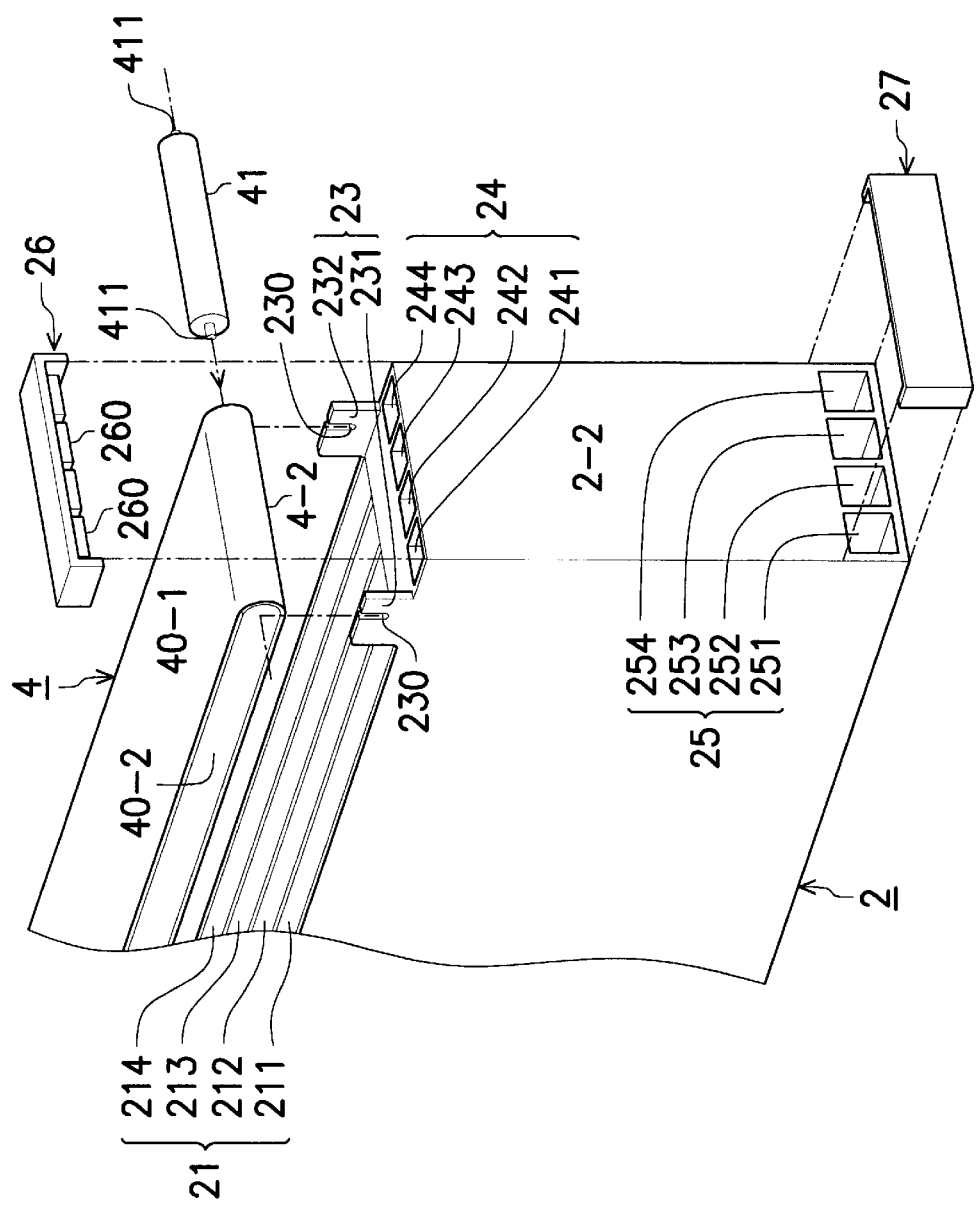
FIG. 5A is a perspective exploded view partially showing the structure of the components according to the dotted-line region (Z2) of FIG. 2 from another.

Referring to FIG. 5A, a partial perspective exploded view shows the relationships between the container 2 and the belt 4 about the dotted-line region Z2 of FIG. 2 observed from another angle.

Figure 5B:
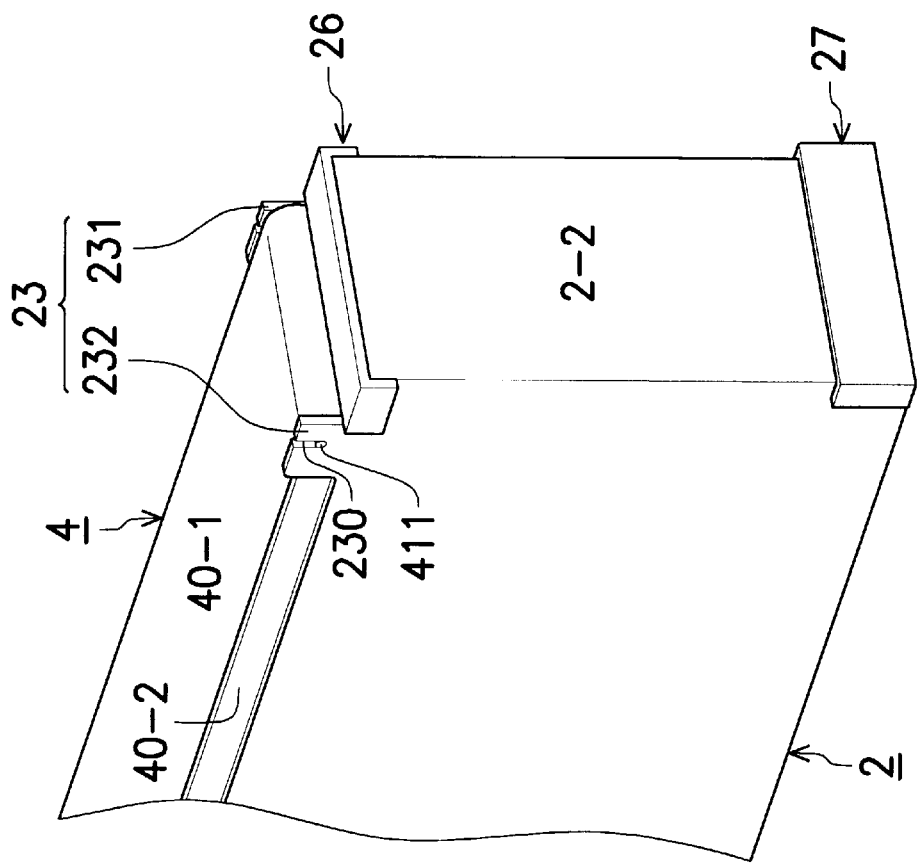
FIG. 5B is a perspective view showing the assembled structure of FIG. 5B.

Two notches 230, 230, respectively formed on the each protrusions 231, 232 of the supporting seat 23, are used to be a bearing seat to receive two shafts 411, 411 of the roller 41. As shown in FIG. 5B, after the roller 41 wrapped in the belt 4 is mounted on the supporting seat 23, the opening 20 is covered with the tensed belt 4.

Referring again to FIG. 5A, an ink inlet assembly 24(inlets 241~244) and an ink outlet assembly 25(outlets 251~254) are formed at the end portions 2-2 of the container 2. Each of the inlets 241~244 is respectively communicated to the corresponding chambers 211~214, and also each of the outlets 251~254 is respectively communicated to the corresponding chambers 211~214. The different basic color inks W1~W4 can be stored in the chambers 211~214 via the inlets 241~244 and expelled out off the container 2 via the outlets 251~254. Two cover plates 26, 27, provided with plugs 260, 270 (shown in FIG. 2) corresponding to the inlets 241~244 and outlets 251~254, are respectively used to seal the ink inlet assembly 24 and the ink outlet assembly 25 before the inks are filled. In FIG. 5B the cover plates 26, 27 are mounted on the container 2, respectively.

Referring again to FIG. 2B, the lower layer 40-2 of the belt 4 is obliquely formed with four holes 401~404 corresponding to the four chambers 211~214 and used to position the four tubes 31~34 moving along the four chambers 211~214, respectively. To simplify the explanation of the relationships among the tubes 31~34 and the other elements, the tube 32 is hereinafter singled out. As far as the intermediate, the second portion 3-2 is detachably mounted on the first portion 3-1 and the tubes 31~34 are positioned therebetween. The first portion 3-1 is a Z-shaped frame structure having four seats 300 which are used to receive the printheads 7, four notches 302 which are used to position each of tubes 31~34, and a through hole 301 which is used to receive the bar 5 therein. The second portion 3-2 is a U-shaped frame structure having a first extension 303 and a second extension 304, wherein the first extension 303 is provided with four holes H1~H4 corresponding to the four holes 401~404 located on the lower layer 40-2 of the belt 4.

The tube 32 is an assembled piping which is composed of several manifolds 320~323 and joints 325~328, for transmitting the ink W2 of the container 2 to the printhead 7. The dotted line D and its arrow shows the allocation of each of the manifolds 320~323 with and joints 325~328 with respect to the container 2, the first portion 3-1 and the second portion 3-2 of the intermediate, the belt 4 and the printhead 7. The manifold 324, used as a sucking portion, is immersed in the ink W2 of the chamber 212 and the manifold 320, used as a discharge portion, is put into the printhead 7 through the hole 71. The joint 325 is used to connect the manifolds 320 and 321, the joint 326 is used to connect the manifolds 321 and 322, the joint 327 is used to connect the manifolds 322 and 323, and the joint 328 is used to connect the manifolds 323 and 324.

As the first portion 3-1 is connected to the second portion 3-2, the lower layer 40-2 of the belt 40 is clamped therebetween and can be moved by the delivery device 3. First, the first extension 303 of the second portion 3-2 is located between the upper layer 40-1 and the lower layer 40-2 with the holes H1~H4 aligned to the holes 401~404. Then, the tube 32 is fixed on the first portion 3-1 and the second portion 3-2 assembled, and the manifold 324 is passed through the hole 402 and immersed into the ink W2 of the chamber 212, the same applies to the rest of the tubes (31, 33 and 34).

When the delivery device 3 is actuated and reciprocally moved along the bar 5, the tubes 31~34, limited and positioned in the holes 401~404, are synchronously moved with the delivery device 3 and the belt 4. The inks W1~W4 stored in the container 2 can be continuously absorbed and transmitted to the printheads 7 through the tubes 31~34 by capillary action, and the printheads 7 can smoothly output the ink without pressure loss.

Therefore, the embodied ink supply system of the present invention can be applied to the printer or plotter to print wide sized media P or documents.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An apparatus for supplying at least one working fluid to an output device, comprising:
    a container used to receive the working fluid, having a longitudinal opening;
    a delivery device used to transmit the working fluid from said container to said output device, said delivery device having a sucking portion immersed in the working fluid and moved along said opening, and a discharge portion connected to said output device; and
    a flexible belt used to move said sucking portion reciprocally along said opening, said flexible belt having at least one hole for positioning said sucking portion.

2. The apparatus as claimed in claim 1, wherein said output device is synchronously moved with said sucking portion.

3. The apparatus as claimed in claim 2, wherein the working fluid is transmitted from said container to said output device by negative pressure within said output device.

4. The apparatus as claimed in claim 2 further comprising a tubing carriage which is moved along said opening by said flexible belt, wherein said sucking portion and said output device are carried by said tubing carriage to move along said opening.

5. The apparatus as claimed in claim 4 further comprising a bar used to guide said tubing carriage.

6. The apparatus as claimed in claim 5, wherein the working fluid is ink and said output device is a printhead.

7. The apparatus as claimed in claim 5, wherein the working fluid is transmitted from said container to said output device by capillary action.

8. An apparatus for supplying at least one working fluid to an output device, comprising:
    a container used to receive the working fluid, having a longitudinal opening;
    a delivery device used to transmit the working fluid from said container to said output device, said delivery device having a sucking portion immersed in the working fluid and moved along said opening, and a discharge portion connected to said output device; and
    a flexible belt that covers the opening and having at least one hole arranged to move the sucking portion reciprocally along said opening.

9. The apparatus as claimed in claim 8, wherein said output device is synchronously moved with said sucking portion.

10. The apparatus as claimed in claim 9, wherein the working fluid is transmitted from said container to said output device by negative pressure within said output device.

11. The apparatus as claimed in claim 9 further comprising a tubing carriage which is moved along said opening by said flexible belt, wherein said sucking portion and said output device are carried by said tubing carriage to move along said opening.

12. The apparatus as claimed in claim 11 further comprising a bar used to guide said tubing carriage.

13. The apparatus as claimed in claim 12, wherein the working fluid is ink and said output device is a printhead.

14. The apparatus as claimed in claim 13, wherein the working fluid is transmitted from said container to said output device by capillary action.

15. A printer for printing documents with at least one printhead, comprising:
    a container used to receive at least one ink, having a longitudinal opening; and
    a delivery device used to transmit the ink from said container to said output device, having a sucking portion immersed in the working fluid and moved along said opening, and a discharge portion connected to said output device;
    a flexible belt covering said opening said flexible belt having at least one hole for moving said sucking portion reciprocally along said opening.

16. The printer as claimed in claim 15, wherein said printhead is synchronously moved with said sucking portion.

17. The printer as claimed in claim 16 further comprising a tubing carriage which is moved along said opening by said flexible belt, wherein said sucking portion and said output device are carried by said tubing carriage to move along said opening.

18. The printer as claimed in claim 17 further comprising a bar used to guide said tubing carriage.

19. The apparatus as claimed in claim 18, wherein the working fluid is transmitted from said container to said output device by negative pressure within said output device.

20. An ink delivery system for feeding ink to a print ink cartridge, the ink delivery system comprising:
    a supply ink reservoir containing ink to be fed to said ink cartridge, said reservoir having a longitudinal opening;
    a tubing device sealingly interconnected between said supply ink reservoir and said print ink cartridge for conveying ink between said supply ink reservoir and said print ink cartridge;
    a tubing carriage for carrying the tubing device along the opening; and
    a flexible belt having a hole in it to move one end of the tubing device in reciprocal motion along said opening.

21. The ink delivery system of claim 20, further comprising a bar to guide the tubing carriage along the longitudinal opening, and wherein the flexible belt covers the longitudinal opening.

* * * * *